(12) United States Patent
Drost (10) Patent No.: US 8,898,201 B1
(45) Date of Patent: Nov. 25, 2014

(54) GLOBAL DATA MIGRATION BETWEEN HOME LOCATION REGISTERS

(71) Applicant: Sprint Communications Company L.P., Overland Park, KS (US)

(72) Inventor: David Drost, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/675,939

(22) Filed: Nov. 13, 2012

(51) Int. Cl.
*G06F 17/00* (2006.01)
*G06F 17/30* (2006.01)

(52) U.S. Cl.
USPC .......................................... 707/803; 707/807

(58) Field of Classification Search
None
See application file for complete search history.

(56) References Cited

U.S. PATENT DOCUMENTS

| | | | |
|---|---|---|---|
| 6,081,811 A * | 6/2000 | Nilsson ................................. | 1/1 |
| 7,953,744 B2 * | 5/2011 | Gharat et al. ................. | 707/758 |
| 7,974,943 B2 * | 7/2011 | Gilbert et al. ................. | 707/610 |
| 2005/0187974 A1 * | 8/2005 | Gong .......................... | 707/104.1 |
| 2011/0208700 A1 * | 8/2011 | Noble ........................... | 707/638 |

FOREIGN PATENT DOCUMENTS

WO    WO 2010002408 A1 *    1/2010

* cited by examiner

*Primary Examiner* — Robert Beausoliel, Jr.
*Assistant Examiner* — Pedro J Santos (57) ABSTRACT

Data migration between Home Location Registers (HLR) may be performed because another HLR platform better suits business needs due to its performance, or because the provider chooses to move to another make, model, or manufacturer, or may be the result of a combination of rationales. Data migration is ideally executed with minimal interruption of service to the customers of the telecommunications provider. The systems and methods disclosed herein provide an automated, repeatable manner of migrating data between HLR platforms using a flat source file created for each table from the original HLR platform being transferred. A series of scripts is created and run and if a step in the process or function of the system is not correctly executed, that source file and/or the series of scripts is edited or otherwise reviewed instead of re-downloading new data from the original HLR platform.

20 Claims, 5 Drawing Sheets

GLOBAL DATA MIGRATION BETWEEN HOME LOCATION REGISTERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the telecommunications industry, a Home Location Register (HLR) is a database that contains customer information and profiles and may also contain global systems information. The HLR communicates with the Mobile Switching Center (MSC) in order to determine if a user is in the home area while trying to initiate a call. This customer information is stored in tables on the HLR. Each table may comprise thousands of entries and hundreds of attributes. The HLR is the platform through which the telecommunications provider provides service to customers. Therefore, the HLR should experience minimal downtime in order to minimize interruptions and disruptions in service to the customer. There is typically only one HLR for a service provider, so any interruptions, including both unplanned or scheduled downtime, can affect the entire network of that service provider, which may amount to millions of users in both the public and private sectors.

SUMMARY

In an embodiment, a method is disclosed of migrating data to a new home location register platform comprising: maintaining a plurality of tables on a first home location register (HLR) platform, determining at least one table of the plurality of tables to migrate to a second HLR platform, wherein the plurality of tables comprise a global parameters table, an MSCID table, a Home Service Area (HSA) table, and an HLR identification table. In this embodiment, determining an at least one attribute in the at least one table to migrate, auditing the at least one attribute, creating, based on a successful audit of the at least one table, an output script, running the output script on the at least one table and generating a source file, wherein the source file comprises a plain text file. The embodiment further comprising auditing the source file to determine if the output script executed correctly, and editing, in response to a determination that the output script did not execute correctly, the output script, wherein the output script is edited and re-run until a source file is output. The embodiment further comprising creating, in response to a determination that the output script executed correctly, a conversion script, running the conversion script on the source file, outputting the converted source file, auditing the converted source file, and editing, in response to a determination that the conversion script did not execute correctly, the conversion script, wherein the conversion script is edited and re-run until a converted source file is output. The embodiment further comprising creating, in response to a determination that the conversion script executed correctly, a load script, running the load script on the converted source file, outputting a loadable, converted source file, auditing the loadable converted source file and editing, in response to determination that the load script did not execute correctly, the load script, wherein the load script is edited and re-run until a loadable converted source file is output. The embodiment further comprising loading, in response to outputting a loadable, converted source file, the loadable, converted source file on to the second HLR.

In an alternate embodiment, a system is disclosed for migrating data to a new home location register platform comprising a first home location register (HLR) platform comprising a plurality of data tables comprising a plurality of attributes, wherein the plurality of data tables further comprise a global parameters table, an MSCID table, a Home Service Area (HSA) table, and an HLR identification table, and a second HLR platform, wherein data is migrated from the first HLR platform to the second HLR platform. The embodiment further comprising a snapshot tool, wherein the snapshot tool is configured to take a snapshot of at least one table of the plurality of data tables from the first HLR platform and a data migration toolbox comprising an existing HLR platform audit tool, a snapshot tool, a source file audit tool, a converted source file audit tool, and a loadable converted source file audit tool. The embodiment also comprising an output script, wherein the output script is configured to generate a source file from the at least one snapshot, a conversion script, wherein the conversion script is configured to convert the source file generated by the output script into a format that can be loaded on to the second HLR platform, and a load script, wherein the load script is configured to output a loadable, converted table.

In an alternate embodiment, a method of migrating data to a new home location register platform comprising maintaining a plurality of tables on a first home location register (HLR) platform, wherein the plurality of tables comprises attributes, determining at least one table of the plurality of tables to migrate to a second HLR platform, wherein the plurality of tables further comprise a global parameters table, an MSCID table, a Home Service Area (HSA) table, and an HLR identification table, determining an at least one attribute in the at least one table to migrate, and auditing the at least one attribute. The embodiment further comprising creating, based on a successful audit of the at least one table, an output script, running, in a testing environment, the output script on the at least one table, generating a source file, wherein the source file comprises a plain text file, and editing, in response to a determination that at least one attribute of the generated source file is not in the format used for the second HLR platform, the source file, creating, in response to a determination that the output script executed correctly, a conversion script, running, in a testing environment, the conversion script on the source file, outputting the converted source file, and editing, in response to a determination that the source file is not in the form used for conversion, the source file, wherein the source file is edited and the conversion script re-run until the conversion script executes correctly. The embodiment further comprising creating, in response to a determination that the conversion script executed correctly, a load script, running, in a testing environment, the load script on the converted source file, editing, in response to a determination that the converted source file does not conform to a form defined for loading, the converted source file, wherein the converted source file is edited and the load script re-run until outputting a loadable, converted source file, loading, in response to outputting a loadable, converted source file, the loadable, converted source file on to the second HLR platform.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Home Location Registers (HLR) platforms are databases used by the telecommunications industry to store information including subscriber information and customer profiles. A platform is a computer system or a computer system having the HLR framework software. Herein, an HLR platform may also be referred to as an HLR. A cell phone is detected by a Mobile Switching Center (MSC) when a user is present in the area covered by the MSC's network. The MSC then determines if the user is within their home area or if the user is a visitor. If the user is in their home area, the HLR platform has the information that may be used to receive a call, initiate a call, or terminate a call that is received or made. If the user is not within their home HLR area, a Visiting Location Register (VLR) contacts the HLR platform of the user in order to set up a temporary user profile so that the user can operate outside of their home area. An HLR may comprise a schema, which may also be referred to as a database schema. As one of ordinary skill in the art knows, a schema defines or describes the organization of data in a data store or database. The database schema may be a collection of meta-data that describes the relationships among tables and/or among attributes in a database. The database schema may be a blueprint that outlines the way that data is organized into tables, what types of data goes into those tables, and the form of the data in those tables. For example, the database schema may define that a first attribute comprises 2 bytes of data, a second attribute comprises up to 128 ASCII characters, a third attribute comprises a real number in twos-complement form, and the like. The database schema may define one or more attributes of a table to be a table key or index.

Data may be migrated from one HLR platform to another due to, for example, deficiencies or capacity limitations of the current HLR platform. The term "data migration" is used to describe the process of taking at least some of the tables from a first HLR platform and loading them on to a second HLR platform. In some cases, this process may involve copying information from at least one table on a first HLR platform and performing a manual review and entry of hundreds of attributes from thousands of entries in a table. Transformation or other editing of the data from the first HLR may be performed depending upon the configuration of the new HLR platform. Traditionally, if there is a problem during the testing or production runs of the new HLR platform, information for each table may be downloaded again from the first HLR platform. If changes were made to the first set of information downloaded from the HLR platform, those changes will also have to be tracked so that they can be applied to any subsequent downloads from the first HLR platform. This process is not only time consuming, but since it not an automated or repeatable process, the manual nature of the process creates the possibility for error. In addition, if any of the attributes in the data may be transformed in order to be in correct format to be loaded on to the new HLR platform, this adds an extra step, and therefore more time as well as another opportunity for error in the data transformation and transfer. Streamlining and automation of the data migration process between HLRs may provide improved service for customers because of the reduced downtime and reduced cost for the provider.

An HLR platform may be replaced for a variety of reasons, and this replacement may involve an upgrade to a different make, model, or manufacturer. If a first HLR platform is in place, and the manufacturer of that HLR platform, or a competitor of the manufacturer of that HLR platform, develops an improved HLR platform, a telecommunications provider may want to replace their first HLR platform with a new, second HLR platform. Improvements to an HLR platform may involve aspects of the HLR's functionality such as increased performance, increased ability to handle different types of networks such as 3G and 4G networks, increased capability and data capacity to support user authentication, increased support ability for fault tolerance and data backups, increased reliability, or improved scalability.

Replacing an HLR platform may involve migrating some or all of the data from a first HLR platform to a second HLR platform. The HLR platform may contain data including subscriber data and global and system service data for the telecommunications provider and its subscribers. The HLR platform comprises tables, and each of the tables has entries with multiple attributes or fields. Tables on an HLR platform may be either dynamic or static, and only the static tables may be migrated. Tables may have several thousand entries, and each entry may have hundreds of attributes. If all or part of a table is selected for migration, the selected entries and attributes may be reviewed to ensure data integrity. The data may be migrated from the first HLR platform to the second HLR platform in a lab environment in order to test the tables to ensure proper functioning of the second HLR platform. More than one migration may be performed, and typically the data is re-downloaded from the first HLR platform when changes are made during the migration process in either a testing (lab) or a production environment. Changes made to the downloaded data are tracked and then implemented once the information is re-downloaded from the first HLR platform. If the data from the first HLR platform is successfully downloaded, converted, and loaded on to the second HLR platform in a lab environment, the data may then be migrated to the production environment. Because the tables may contain thousands of entries and each entry may have hundreds of attributes, manual transfer of the data is both time consuming and may present opportunity for error. Since an HLR platform is the database used to provide service to subscribers in a telecommunications provider's network, in a successful manual data migration the users of the telecommunication service would experience delay or interruption of service. This means that aspects of the data migration process such as efficiency, reliability, and accuracy may be evaluated and changed in order to improve or streamline the process.

In an embodiment of the present disclosure, the data on the first HLR platform is frozen at a certain time. This freezing of data may also be referred to as taking a "snapshot" by copying or extracting the data to a flat file. A transformation, or in some cases a deletion, of attributes stored in the snapshot or extracted file may be performed depending upon the format specified for loading tables on to the new, second, HLR platform. The specifications of the second HLR platform may be reviewed for each table, and for each attribute within each table. If, for example, attribute X was indicated by a string of numbers on the first HLR, and now may be indicated by an alphanumeric code on the second HLR, that data may be transformed prior to converting the file to load on to the second HLR. In another example, the attribute "vendor ID" for a vendor type may have been a number in the original HLR and a letter code or a string in the new HLR platform.

There may be a gap of time between when the migration occurs and when the new platform is implemented into the production environment. This gap may be due to testing the data migration process, for example, in a lab environment, or due to resource availability. If changes are made to the data in the test environment, the source file, which may also be referred to as an intermediate flat file, may be updated accordingly. This is in contrast to tracking changes during testing and then implementing those changes to the data when the data was re-downloaded from the first HLR. Re-downloading information from the first HLR platform may entail re-reviewing the data integrity, reviewing and implementing any transformations, and implementing any changes resulting from prior attempts at data migration. In an embodiment, the changes can be tracked and implemented as the source file is generated, converted, and loaded, at any stage during that process. Maintaining and updating the source file as the testing of the data migration proceeds is in contrast to tracking changes and re-implementing the migration and may be a more time efficient, repeatable method of data migration between HLRs.

In an embodiment, part of the complete system of the second HLR platform is tested first, then the system is wiped, then re-done, then the complete system is tested. This would amount to two or more migrations in the lab environment, wherein in a production environment there may only be one migration.

In an embodiment, the snapshot is taken, and an output script is created to run on that snapshot in order to generate a source file. If the output script does not execute correctly, the script is edited and re-run until the source file is correctly generated. If the output script executes correctly, a conversion script is created to convert the source file generated by the output script. If the conversion script does not run correctly, the script is edited and re-run until a converted source file is output. If the conversion script runs correctly, a load script is created in order to make the converted source file into a file that can be loaded on to the HLR platform in either a testing (lab) or a production environment. If the load script does not execute correctly, the script is edited and re-run until a loadable converted source file is output. In each case, the source file or the converted source file may be used for the re-running of the output, conversion, or load script. This is in contrast to re-downloading the data from the first HLR platform and reviewing data integrity and transformation of the data again. By using a flat file to test script changes, the data migration process may be more automated, more repeatable, and less time consuming which may reduce overhead for the telecommunications provider and enable better service to the customer.

In an embodiment, the snapshot is taken, and an output script is created to run on that snapshot in order to generate a source file. If a source file is not correctly generated, the snapshot data is reviewed and may be re-audited or retransformed and the output script re-run and the snapshot re-reviewed until a source file is correctly generated. If the output script executes correctly, a conversion script is created to convert the source file generated by the output script. If a correctly converted source file is not output after the conversion script is run, the source file generated by the output script is reviewed and edited, and the conversion script re-run, until a correctly converted source file is output. If the conversion script runs correctly, a load script is created in order to make the converted source file into a file that can be loaded on to the HLR platform in either a testing (lab) or a production environment. If a loadable converted source file is not output, the converted source file may be reviewed and audited, and the conversion script re-run, until a loadable, converted source file is output. In each case when a script is run, the source file or the converted source file is reviewed and edited before re-running of the output, conversion, or load script. This is in contrast to re-downloading the data from the first HLR platform and reviewing data integrity and transformation of the data again. By using a flat file to test script changes, the data migration process may be more automated, more repeatable, and less time consuming. In addition, in some embodiments, if changes are made to the file during the editing process after a script is run, those changes are made to the source file, or a revision-controlled copy of the source file, in order to preserve the changes made during the data migration process.

Figure 1:
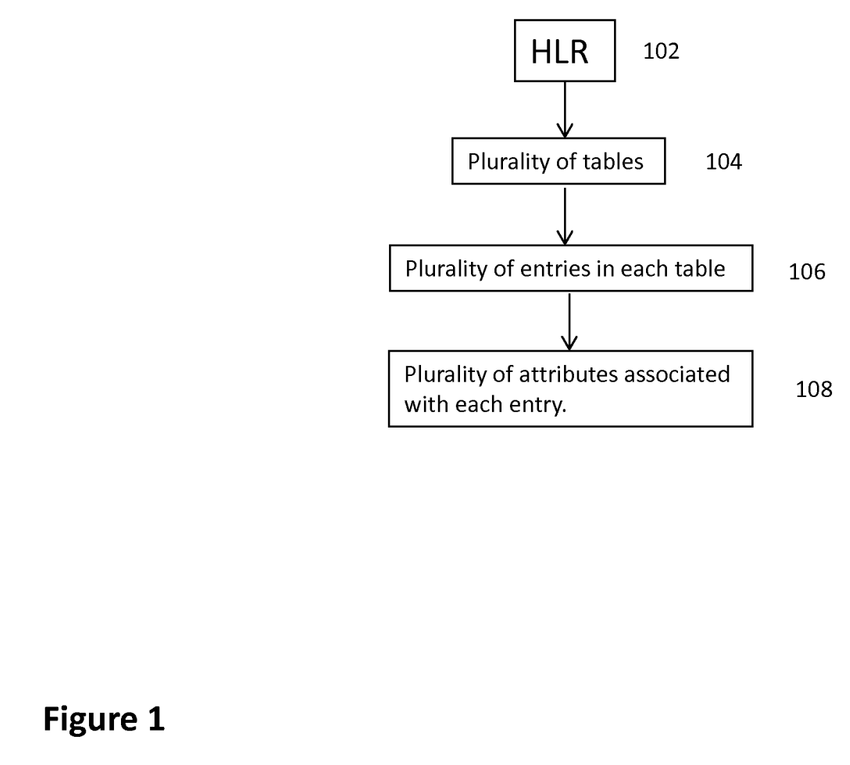
FIG. 1 is an illustration of Home Location Register system components.

FIG. 1 is an illustration of an HLR platform 102. FIG. 1 illustrates that the HLR platform 102 may comprise a plurality of tables 104; the each of the tables 104 may comprise a plurality of entries 106; each of the entries 106 may comprise a plurality of attributes 108. Some or all of the tables 104 from an HLR platform 102 may be migrated. The tables 104 may comprise dynamic or static data, and the dynamic data tables may not be migrated. The HLR platform 102 may comprise customer information and global systems information. The customer information may comprise customer name, customer number, home area, roaming area, timer information, country codes, usage statistics, and other information in order to provide service to the customer. In an embodiment, the HLR platform tables 104 may comprise a global parameters table, an MSCID table, a Home Service Area (HSA) table, and an HLR identification table Authorized Roaming List Flags Table (ARL), an ARL List Status, a Negative Call Forward Digit Screening (CFDS) table, a Feature Service Code table, a Call Forward Digits (CF) table, a CF Digits Type table, a IS41 Timers table, a Search Access SubSystem Number (SSN) table, a Search Access Point Code (PC) table, a Home Mobile Country Code (HMCC) table, a Split Numbering Plan Administration and Mobile Directory Number (NPA MDN) table, a Message Center Index table, an Announcement table, a Destination table, a Wireless Intelligent Network Service Trigger (WIN), and an SS7 Point Code table.

In some cases herein the terms HLR platform and HLR may be used interchangeably. When used carefully, the term HLR platform may refer to a computer system and application programming interface that provide access to a HLR data store (e.g., the tables 104 and their content), and the term HLR may refer to the HLR data store. In most cases herein, however, this distinction may not be vital.

Figure 2:
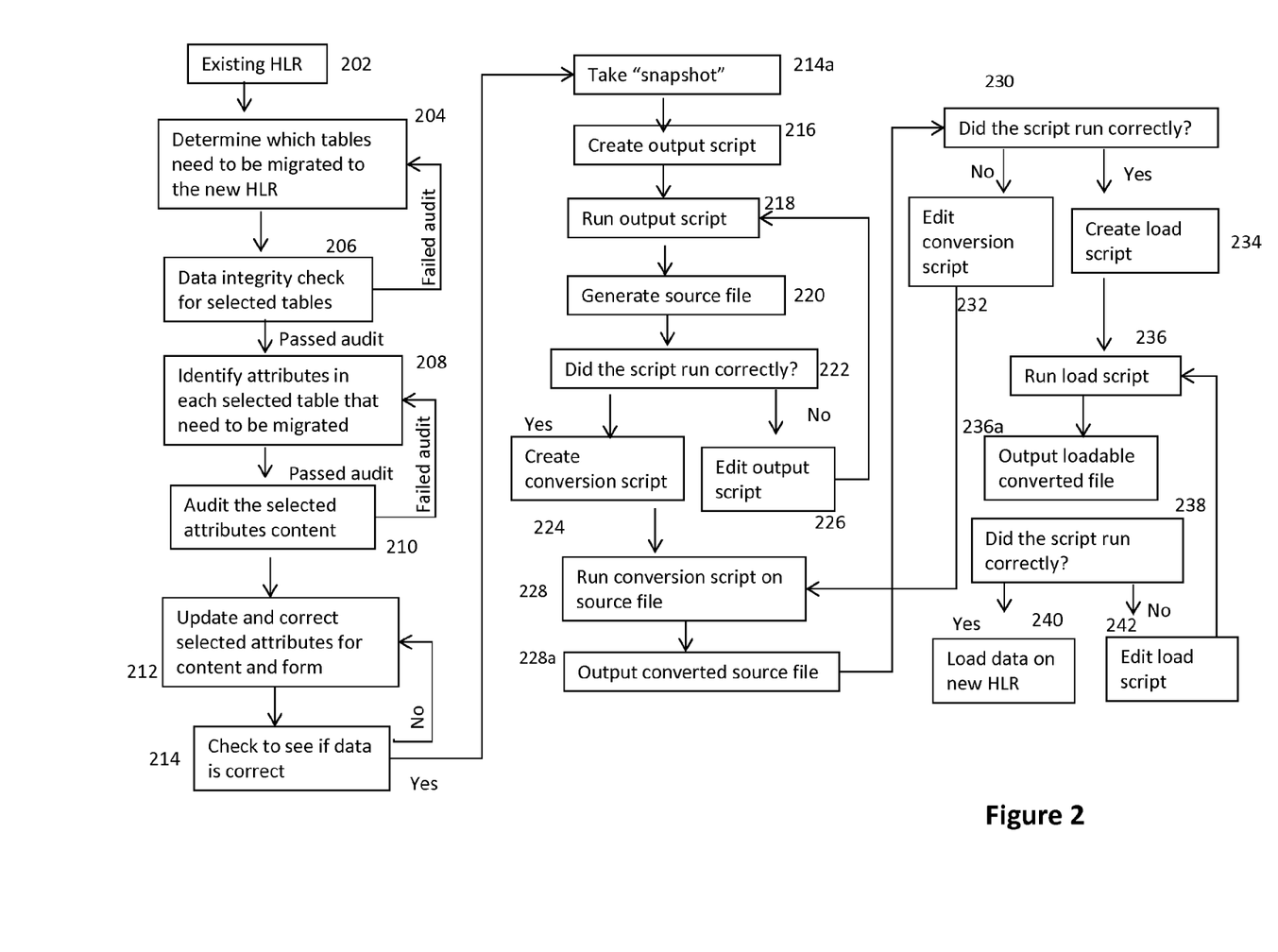
FIG. 2 is an embodiment of a method of data migration between HLRs.

FIG. 2 illustrates an embodiment of a method for data migration between an existing HLR platform 202 and a new HLR platform. In order to migrate data, a determination is made as to which tables will be migrated to the new HLR platform 204 and the integrity of the data is checked for the selected tables at block 206, this may also be referred to as an audit. The data integrity check may comprise checking for empty fields, unusable information, or incomplete information. If the data integrity audit is successful, each selected table is reviewed for attributes to be migrated at block 208, since not every attribute from a table may be migrated. In an embodiment (not shown), only selected entries will be migrated. Once the attributes have been reviewed at block 210, which may also be referred to as auditing, some or all of the selected attributes may be updated for form and/or content at block 212. Attributes may be updated for form and/or content, for example, if the current HLR platform uses a string of numbers in a particular attribute or attributes and the new HLR platform uses an alphanumeric entry. In another example, the current HLR platform may use a True/False indicator where the new HLR platform uses a word string or number. In another example, an attribute or multiple attributes may be deleted entirely because they may not be used or may be replaced by another attribute generated by the new HLR based on, for example, the data of other attributes in that table. The data is checked which may be a step referred to as a review, a check, or an audit, to see if the updates have been made correctly at block 214. If the updates were not made correctly or if further updates may be implemented, the process returns to step at block 212. If the data is correct, a "snap shot" or "freeze frame" picture is taken at block 214a of the data. This snapshot is used for the flat files discussed below so that a static, reviewed/audited, controllable source of information is available during the data migration process in case changes are made to the scripts or files discussed below with respect to FIGS. 2 and 3. The above steps at block 208-214 may be repeated for each table that is determined at block 204 to be a table to be migrated to the new HLR. The snapshot may be used as a baseline if the output script at block 216 does not execute correctly as described below.

An output script is created at block 216 and run at block 218 to generate a source file at block 220 that contains the data taken in the snap shot at block 214a. The source file at block 220 is a flat file that may be used as a template in order to store and update data as the data migration process proceeds. It should be noted that the term is not used to refer to a file that contains source code, but rather a file that contains data from a source, in this case, the HLR platform at the origin of a data migration process. If the script executes correctly at block 222, and an audit of the output source file is successful, a conversion script is created at block 224. A source file 220 may be generated, and it may be correctly generated in whole or in part. If the script did not run correctly, for example, if the script did not execute, executed in part, or if the execution resulted in the output of the wrong format or data, it may be due to something missing or incorrect in the script or data. An incorrectly executed script may be indicated by missing information, incorrect information, incorrect format, or other problems with data integrity or form, the output script is edited at block 226 and re-run at block 218. Steps at block 226 and at block 218 are repeated until the source file at block 220 is generated correctly.

Once a source file at block 220 is generated correctly, a conversion script is created at block 224 and run at block 228 by the computer on the source file at block 220 in order to convert the file to the appropriate format for the new HLR platform and a converted source file is output. If the script did not run correctly, and the file was thereby converted incorrectly, converted in part, not converted at all, or experienced any other errors when the conversion script was run on the source file at block 228, the conversion script is edited at block 232 and re-run at block 228. Steps at block 232 and at block 228 are repeated until the script successfully executes on the source file at block 220 to output a converted source file at block 228a. If the conversion script at block 230 runs correctly, a load script is created at block 234.

A load script is created at block 234 and run by a computer on the converted source file 236 to output a loadable, converted source file at block 236a. If the load script executes correctly, and a loadable, converted source the data is loaded on to the new HLR platform at block 240. If the load script did not execute correctly, the load script is edited at block 242 and re-run at block 236 until the converted source file at block 228 is output as a loadable, converted source file at block 236a. By editing the scripts and using the same flat file as used in the initial run of a script, whether it is the snapshot at block 214a at the output script at block 216 step, the conversion script at block 224 run at block 228 on the source file generated at block 220, or the load script at block 234 run at block 236 on the converted source file at block 236a, the table's information from the HLR platform may not be re-downloaded. It should be noted that re-downloading data from one or more tables from the first HLR platform at block 202 may mean revisiting review and analysis steps at blocks 206-214. This may be, in whole or in part, a manual process which may be time-consuming and may present multiple opportunities for error based upon not only the manual nature of the tasks but also the number of tables, entries, and attributes to be reviewed. After the data migration is complete at step 238, at least one call is successfully initiated and completed based on the new HLR platform.

In an embodiment (not pictured), the method is run in a lab environment and may be run more than once in order to create loadable converted source file. The disclosed method enables the party performing the data migration to edit a script using a flat source file instead of having to go back to the original HLR platform at block 202 and download a new set of information, which would mean that the newly downloaded set of information may have to go through all or part of steps at blocks 204-242 until an error is found and then a new set of information would be downloaded. Editing the scripts automates the process and makes it repeatable using the source file generated at block 220. The reason that this process is repeatable is because the bugs or other flaws in the data migration process and the scripts and data used in the process have been discovered and corrected through the iterations of execution followed by a validation of results.

Figure 3:
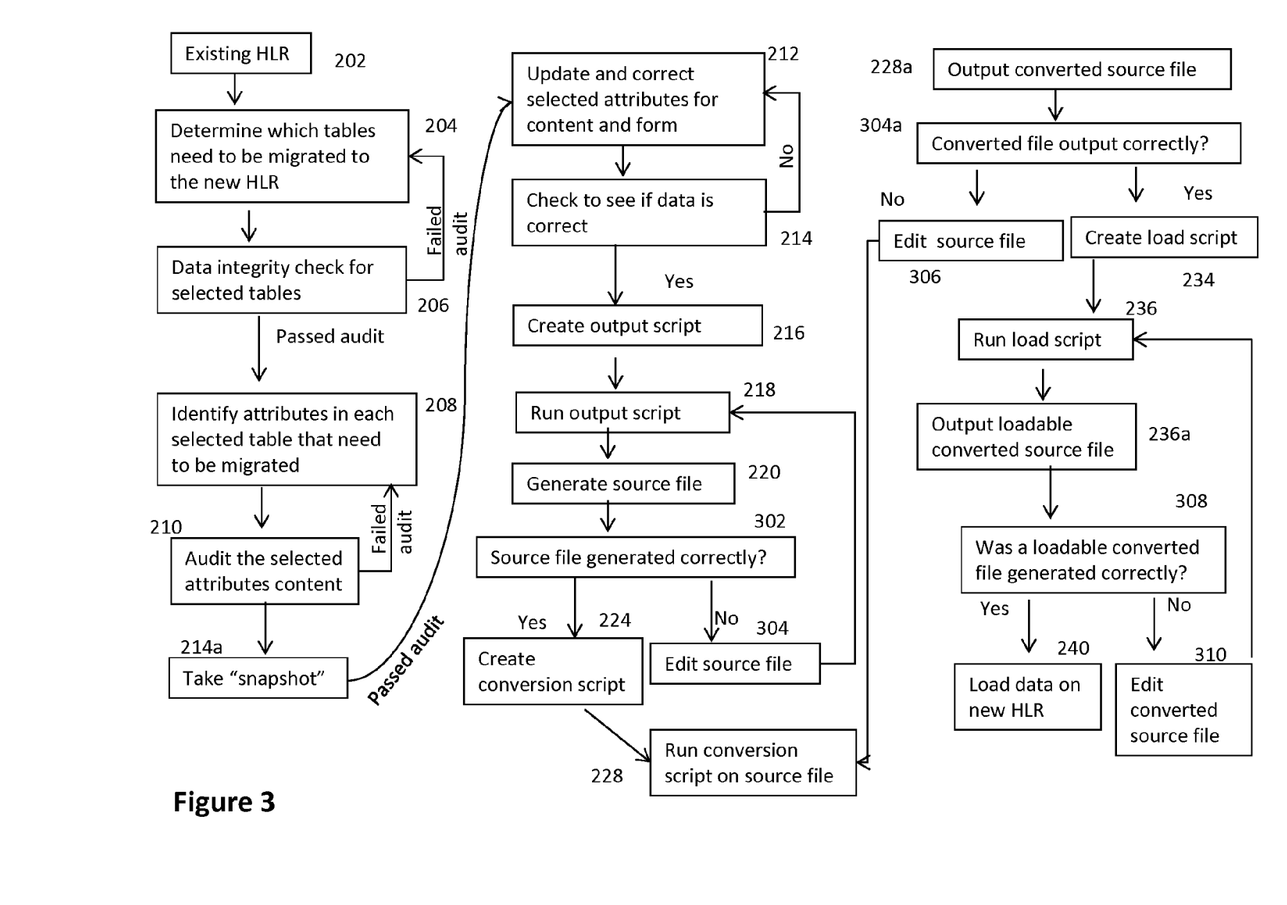
FIG. 3 is an embodiment of a method of data migration between HLRs.

FIG. 3 illustrates another embodiment of a method data migration between HLRs. An existing HLR platform at block 202 is reviewed to determine which table or tables are to be migrated to the new HLR platform at block 204. A data integrity check may be performed, which may also be referred to as an audit, at block 206. If the audit is not successful, the tables are reviewed again at block 204. If the audit is successful attributes in each selected table are identified and selected for migration at block 208 and the selected attributes are audited at block 210 for data integrity. If the audit fails, the attributes are reviewed again at block 208. If the audit is successful, a snapshot or freeze frame at block 214a is taken of the data in the selected attributes in the selected table. The attributes may then be updated and corrected at block 212 for form or content. An update for form may comprise updating a numeric entry to an alphanumeric entry, or updating a Yes/No entry to a True/False entry, and an update for content may comprise updating a numeric indicator to a word string. The data is then reviewed at block 214 and if it is incorrect or incomplete, the attributes may be updated and corrected at block 212. If the data is correct, an output script is created at block 216 and run at block 218 to generate or create a source file at block 220. If the source file did not generate or build correctly at block 220, the file is edited at block 304. A source file may generate or build incorrectly if it only partially generates, if the information is incorrect, if the information is non-sensical, or if only through the testing process of running this or another script was it determined that different and/or additional transformation of the data may be performed. If the source file is generated or built correctly at block 220, a conversion script is created at block 224 and run at block 228 on the source file at block 220 to output a converted source file at block 228a. At block 304a, if a converted source file is not correctly output, the source file is edited at block 306 and the conversion script re-run on the source file at block 228 until a correctly converted source file is output. When the converted source file at block 228a outputs correctly after step at block 304a, a load script is created at block 234 and run on the converted source file at block 236 to output a loadable converted source file at block 236a. If a loadable converted source file is correctly generated or built at block 308, the data is loaded on to the new HLR platform at block 240. When the converted source file is not transformed into a loadable converted file, the converted source file is edited at block 310 and the load script is re-run at block 236 until a loadable converted file is generated. After the data migration is complete, at least one call is successfully initiated and completed based on the new HLR platform.

Figure 4:
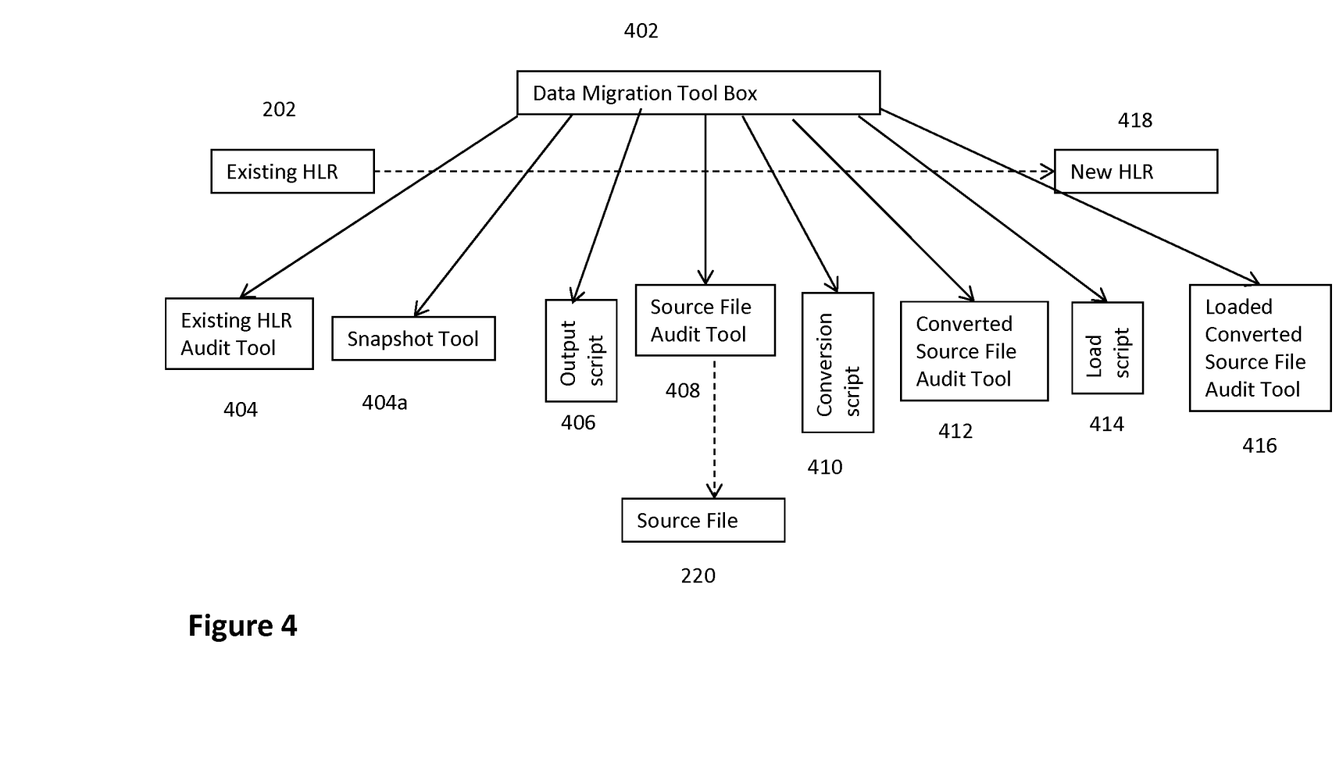
FIG. 4 is an embodiment of a system of data migration between HLRs.

FIG. 4 illustrates an embodiment of a system for data migration between HLRs. Data from an existing HLR platform at block 202 is migrated to a new HLR platform at block 418. A data migration toolbox at block 402 comprises an existing HLR audit tool at block 404. This tool at block 404 may be used to audit the data, the tables, entries, and attributes disclosed in FIG. 1, prior to the snapshot tool on the computer at block 404a taking a snapshot of at least one table for conversion. The system may be used to migrate HLR platform data and may only migrate one table at a time. The data migration toolbox at block 402 further comprises an output script at block 406, a source file audit tool at block 408 which audits the source file at block 220 generated by the output script at block 406. The data migration toolbox 402 may further comprise a conversion script at block 410 that may be used to convert the source file 220 and a converted source file audit tool at block 412 that may be used to audit the source file after the conversion script is run at block 410 by the computer to ensure that the script executed correctly. The data migration toolbox at block 402 may also comprise a load script at block 414 that prepares the converted source file for loading on to the new HLR platform at block 418 and a loaded converted source file audit tool 416 that audits the converted source file after the load script at block 414 runs to ensure the file is able to be uploaded on to the new HLR platform at block 418.

Figure 5:
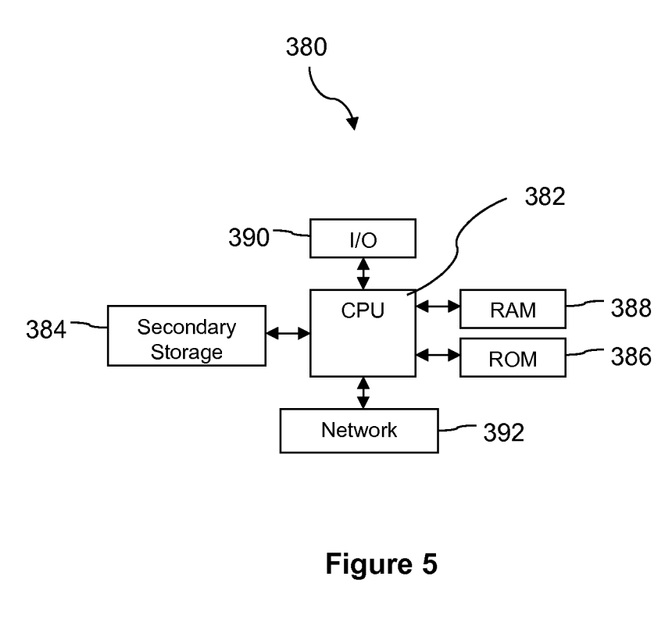
FIG. 5 illustrates a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-implemented method of migrating data from a first home location register (HLR) platform to a second HLR platform, the method comprising:

maintaining a plurality of tables on a first HLR platform that includes a first computer system comprising a processor and a non-transitory memory, wherein the first HLR platform enables any of voice and data telecommunication services via a radio access network by communicating with a mobile switching center (MSC);

determining at least one table of the plurality of tables to be migrated to a second HLR platform via a source file, wherein the plurality of tables comprise a global parameters table, an MSCID table, a Home Service Area (HSA) table, and an HLR identification table;

determining at least one attribute in the at least one table to be migrated;

based on determining the at least one attribute in the at least one table, auditing the at least one attribute, wherein auditing comprises determining data integrity of the at least one attribute;

based on a successful audit, creating an output script;

running the output script on the at least one table, wherein running the output script generates the source file that comprises a plain text file;

reviewing the source file to determine whether the output script executed correctly;

responsive to a determination that the output script did not execute correctly based on the reviewed the source file, editing the output script, wherein the output script is edited and re-run until the source file that is outputted is determined to be executed correctly;

responsive to a determination that the output script executed correctly based on the reviewed source file, creating a conversion script;

running the conversion script on the source file, wherein running the conversion script outputs a converted source file;

reviewing the converted source file to determine whether the conversion script executed correctly;

responsive to a determination that the conversion script did not execute correctly based on the reviewed converted source file, editing the conversion script, wherein the conversion script is edited and re-run until the converted source file that is outputted is determined to be executed correctly;

responsive to a determination that the conversion script executed correctly based on the reviewed converted source file, creating a load script;

running the load script on the converted source file, wherein running the load script outputs a loadable converted source file;

reviewing the loadable converted source file to determine whether the load script executed correctly;

responsive to determination that the load script did not execute correctly based on the reviewed loadable converted source file, editing the load script, wherein the load script is edited and re-run until the loadable converted source file that is outputted is determined to be executed correctly;

responsive to outputting the loadable converted source file that is reviewed, loading the loadable converted source file on to the second HLR platform that includes a second computer system comprising a processor and a non-transitory memory, wherein loading the loadable converted source file on to the second HLR platform enables any of voice and data telecommunication services via the radio access network by communicating with the MSC; and subsequent to loading the loadable converted source file on to the second HLR platform, routing any of a voice and data telecommunication call via the radio access network based on the second HLR platform.

2. The method of claim 1, wherein the global parameters table is loaded first, wherein the MSCID table, the Home Service Area (HSA) table, and the HLR identification table are subsequently loaded, and wherein the MSCID, HSA, and HLR tables are loaded prior to loading of other tables.

3. The method of claim 1, further comprising responsive to a determination that the at least one attribute is to be updated, updating the attribute, wherein the attribute is updated for at least one entry of the pluralities of entries, and wherein the data integrity comprises ensuring that the at least one attribute has the appearance and characteristics that conform to the schema of the tables of the second HLR platform.

4. The method of claim 1, wherein the first and the second HLR platforms are at least one of a different make, a different model, and are manufactured by a different manufacturer.

5. The method of claim 1, wherein the tables further comprise any of an Authorized Roaming List Flags Table (ARL), an ARL List Status, a Negative Call Forward Digit Screening (CFDS) table, a Feature Service Code table, a Call Forward Digits (CF) table, a CF Digits Type table, a IS41 Timers table, a Search Access SubSystem Number (SSN) table, a Search Access Point Code (PC) table, a Home Mobile Country Code (HMCC) table, a Split Numbering Plan Administration and Mobile Directory Number (NPA MDN) table, a Message Center Index table, an Announcement table, a Destination table, a Wireless Intelligent Network Service Trigger (WIN), and an SS7 Point Code table.

6. The method of claim 3, wherein the at least one attribute is updated to change at least one of the format or content of the attribute.

7. The method of claim 3, wherein the at least one attribute is updated to delete the entry.

8. A system for migrating data to a new home location register platform comprising:

a mobile switching center (MSC) that is communicatively coupled with a radio access network;

a first computer system comprising a processor and a non-transitory memory;

a first home location register (HLR) platform comprising the first computer system and a plurality of data tables that include a plurality of attributes, a global parameters table, an MSCID table, a Home Service Area (HSA) table, and an HLR identification table, wherein the first HLR platform enables any of voice and data telecommunication services via the radio access network by communicating with the MSC;

a data migration toolbox comprising an existing HLR platform audit tool, a snapshot tool, a source file review tool, a converted source file review tool, and a loadable converted source file review tool, wherein the snapshot tool, that is stored in a non-transitory memory and executable by a processor, is configured to take a snapshot of at least one table of the plurality of data tables from the first HLR platform;

an output script stored in a non-transitory memory and executable by a processor, wherein the output script is configured to generate a source file from the snapshot, and wherein the source file includes an intermediate flat file;

a conversion script stored in a non-transitory memory and executable by a processor, wherein the conversion script is configured to convert the source file generated by the output script into a format that can be loaded on to a second HLR platform, wherein the second HLR platform is configured to enable any telecommunication services via the radio access network;

a load script stored in a non-transitory memory and executable by a processor, wherein the load script is configured to output a loadable, converted table;

a second computer system comprising a processor and a non-transitory memory; and the second HLR platform comprising the second computer system, wherein at least one of the plurality of data tables of the first HLR platform is migrated from the first HLR platform to the second HLR platform via the source file, and wherein any of a voice and data telecommunication call is routed via the radio access network based on the second HLR platform communicating with the MSC.

9. The system of claim 8, wherein the global parameters table is loaded first, wherein the MSCID table, the Home Service Area (HSA) table, and the HLR identification table are subsequently loaded, and wherein the MSCID, HAS, and HLR identification tables are loaded prior to any other tables.

10. The system of claim 8, wherein the first and the second HLR platforms are at least one of a different make, a different model, and are manufactured by a different manufacturer.

11. The system of claim 8, wherein the tables further comprise any of an ARL Flags Table (Authorized Roaming List), an ARL List Status, a Negative Call Forward Digit Screening (CFDS) table, a Feature Service Code table, a Call Forward Digits (CF) table, a CF Digits Type table, a IS41 Timers table, a Search Access SubSystem Number (SSN) table, a Search Access Point Code (PC) table, a Home Mobile Country Code (HMCC) table, a Split Numbering Plan Administration and Mobile Directory Number (NPA MDN) table, a Message Center Index table, an Announcement table, a Destination table, a Wireless Intelligent Network Service Trigger (WIN), and an SS7 Point Code table.

12. The system of claim 10, wherein a schema of the second HLR platform uses at least one of a different format or a different content of the at least one attribute.

13. The system of claim 10, wherein a schema of the second HLR platform does not use the at least one attribute, and wherein the at least one attribute is deleted.

14. A method of migrating data to a new home location register platform comprising:

maintaining a plurality of tables on a first home location register (HLR) platform comprising a first computer system that includes a processor and a non-transitory memory, wherein the first HLR platform enables any of voice and data telecommunication services via a radio access network by communicating with a mobile switching center (MSC), and wherein the plurality of tables comprises attributes;

determining at least one table of the plurality of tables to migrate to a second HLR platform comprising a second computer system that includes a processor and a non-transitory memory, wherein the plurality of tables further comprise a global parameters table, an MSCID table, a Home Service Area (HSA) table, and an HLR identification table;

determining an at least one attribute in the at least one table to migrate;

auditing the at least one attribute, wherein auditing comprises determining data integrity of the at least one attribute;

creating, based on a successful audit of the at least one table, an output script;

running, in a testing environment, the output script on the at least one table;

generating a source file comprising a plain text file;

responsive to a determination that at least one attribute of the generated source file is not in the format used for the second HLR platform, editing the source file;

responsive to a determination that the output script executed correctly, creating a conversion script;

running, in a testing environment, the conversion script on the source file;

outputting the converted source file;

responsive to a determination that the source file is not in the form used for conversion, editing the source file, wherein the source file is edited and the conversion script re-run until the conversion script executes correctly;

responsive to a determination that the conversion script executed correctly, creating a load script;

running, in a testing environment, the load script on the converted source file;

responsive to a determination that the converted source file does not conform to a form defined for loading, editing the converted source file, wherein the converted source file is edited and the load script is re-run until a loadable converted source file is output;

responsive to outputting the loadable converted source file, loading the loadable converted source file on to the second HLR platform, subsequent to loading the loadable converted source file on to the second HLR platform, routing any of a voice and data telecommunication call via the radio access network based on the second HLR platform.

15. The method of claim 14, wherein the global parameters table is loaded first, and wherein the MSCID table, the Home Service Area (HSA) table, and the HLR identification table are subsequently loaded.

16. The method of claim 14, further comprising responsive to a determination that the at least one attribute is to be updated, updating the attribute, wherein the attribute is updated for at least one entry of the pluralities of entries, and wherein the data integrity comprises ensuring that the at least one attribute has the appearance and characteristics that conform to the schema of the tables of the second HLR platform.

17. The method of claim 14, wherein the first and the second HLR platforms are at least one of a different make, a different model, and are manufactured by a different manufacturer.

18. The method of claim 14, wherein the tables further comprise any of an ARL Flags Table (Authorized Roaming List), an ARL List Status, a Negative Call Forward Digit Screening (CFDS) table, a Feature Service Code table, a Call Forward Digits (CF) table, a CF Digits Type table, a IS41 Timers table, a Search Access SubSystem Number (SSN) table, a Search Access Point Code (PC) table, a Home Mobile Country Code (HMCC) table, a Split Numbering Plan Administration and Mobile Directory Number (NPA MDN) table, a Message Center Index table, an Announcement table, a Destination table, a Wireless Intelligent Network Service Trigger (WIN), and an SS7 Point Code table.

19. The method of claim 16, wherein the at least one attribute is updated to change at least one of the format or content of the attribute.

20. The method of claim 16, wherein the at least one attribute is updated to delete the entry.

* * * * *